324-77.
SR
11-16-71    XR    3,621,220

[11] 3,621,220

[72] Inventor Norman C. Ford, Jr.
Flat Hills Road, Amherst, Mass. 01002
[21] Appl. No. 854,175
[22] Filed Aug. 29, 1969
[45] Patented Nov. 16, 1971

[54] SCATTERED LIGHT MEASUREMENT PROVIDING AUTOCORRELATION FUNCTION
5 Claims, 5 Drawing Figs.

[52] U.S. Cl................................................ 235/181,
324/77, 356/103, 356/210
[51] Int. Cl....................................................... G06g 7/19,
G01m 21/00
[50] Field of Search............................................ 235/181,
151.3, 151.35; 324/77 H, 77 I, 77 J; 356/103, 104,
210; 250/218

[56] References Cited
UNITED STATES PATENTS
3,388,240  6/1968  Robbins ........................  324/77 I X
3,441,724  4/1969  Taylor, Jr. .....................  235/181
3,474,286  10/1969  Hergenrother ...............  324/77 I X
3,509,453  4/1970  Wilmotte........................  324/77 I

*Primary Examiner*—Joseph F. Ruggiero
*Attorney*—Martin Kirkpatrick

ABSTRACT: A method for measuring the diffusion constant of a macromolecule moving in a medium, e.g., in solution or suspension, comprising direction, at a sample of a macromolecule-containing medium, an incident light beam having a coherence length which is long compared to sample size, collecting light scattered by the macromolecular sample at an angle $\theta$ to the incident light beam in a sensor capable of producing a first electrical signal dependent upon the change in intensity of the collected light with time, and having a component due to scattering of light by said macromolecules, computing the autocorrelation function of said component, and producing a second electrical signal related to said autocorrelation function.

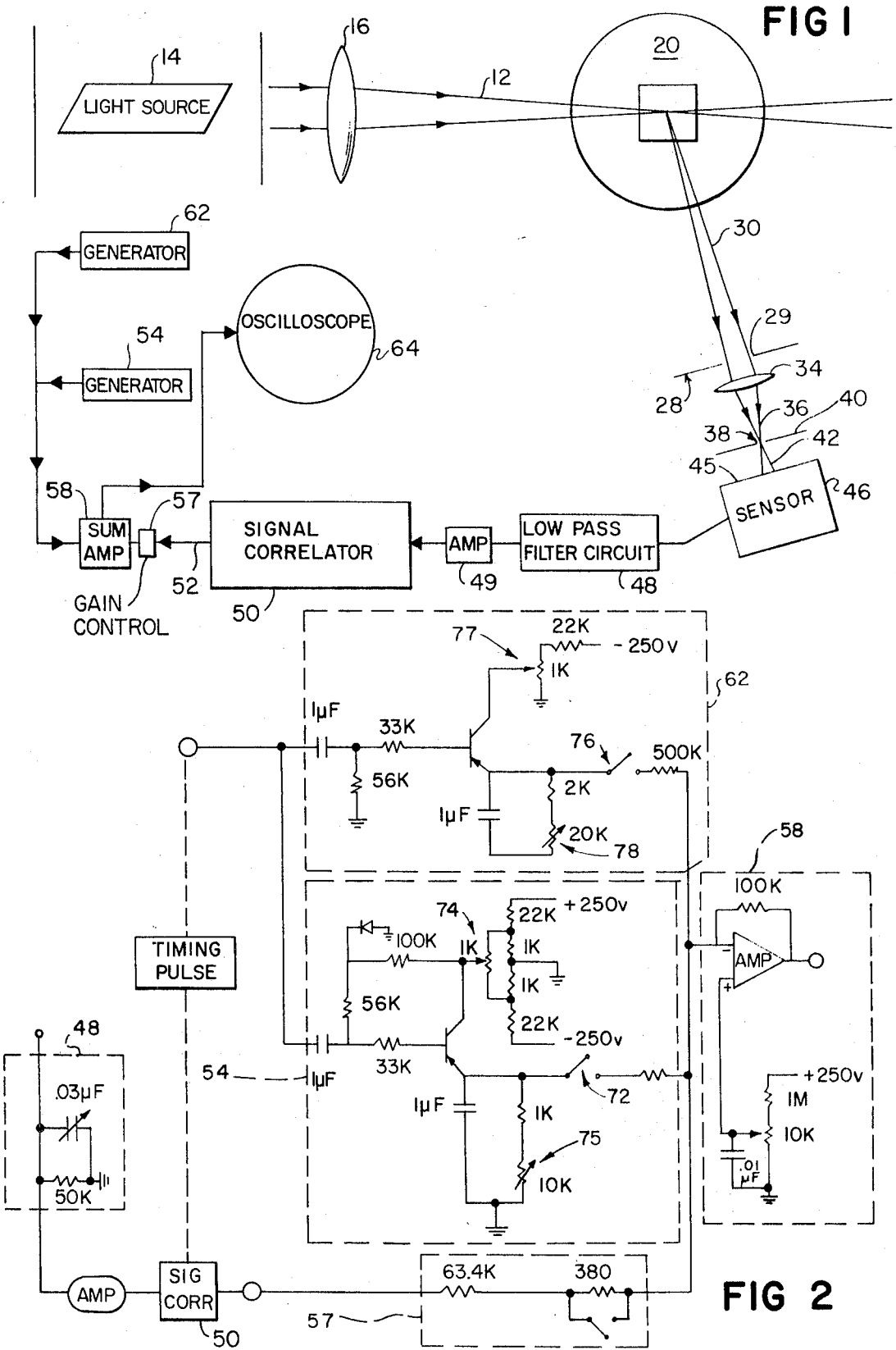

SCATTERED LIGHT MEASUREMENT PROVIDING AUTOCORRELATION FUNCTION

This invention relates to utilizing light scattering phenomena to measure molecular properties.

A light beam passing through a sample of macromolecules (500 or greater molecular weight) in a medium permitting macromolecule movement (e.g., a solution or suspension) will be scattered and, at any angle $\theta$ to the incident beam, will produce a broadened Lorenzian spectrum which may be interpreted in terms of a Doppler shift due to Brownian motion of the macromolecules. A first order analysis will lead to the following equation, relating the translational diffusion coefficient, D, of the particular macromolecule in the solution to the half-width of the resultant Lorenzian spectrum, $\Gamma_D$:

$$\Gamma_D = \frac{16\pi^2 n^2 D \sin^2 \theta/2}{\lambda_0^2}$$

where:

$\lambda_0$ is the wavelength of the incident light;
$n$ is the refractive index of the solvent; and
$\theta$ is the scattering angle.

In turn, D may be used to measure, e.g., conformational parameters of the molecules or their molecular weights.

It is an object of this invention to convert data from light-scattering phenomena to parameters of the light-scattering molecules, rapidly, simply, and accurately. Other objects are to provide systems of simple and economical construction for processing the electrical output of photomultipliers and similar recording devices to produce molecular data. Still another object is to provide a method for measuring the molecular weight of macromolecules, which is adaptable to continuous, in line sampling.

The invention features a method for measuring the diffusion constant of a macromolecule moving in a medium comprising directing, at a sample of a macromolecule-containing medium, an incident light beam having a coherence length which is long compared to sample size, collecting light scattered by the macromolecular sample at an angle $\theta$ to the incident light beam in a sensor capable of producing a first electrical signal dependent upon the change in intensity of the collected light with time, and having a component due to scattering of light by said macromolecules, computing the autocorrelation function of said component, and producing a second electrical signal related to said autocorrelation function.

In a preferred embodiment, the entire first signal is fed to an autocorrelation computer, and the computer output signal is thereafter divided so as to separate components due to light scattering by macromolecules from the rest of the components (i.e., the background signal due to compensating electrical systems, such as filters, utilized with the computer). This separation may be accomplished by subtracting the background signal from the total computer output signal so as to leave a signal dependent only on macromolecular light-scattering. A generator is used to generate a signal to cancel out the latter signal, and the generator settings are calibrated for readout as, e.g., a translational macromolecular diffusion constant or a number calculable therefrom.

Other objects, features and advantages will appear from the following description of a preferred embodiment of the present invention, taken together with the attached drawings thereof, in which:

FIG. 1 is a schematic view of an assembly of apparatus illustrating a preferred embodiment of the present invention;

FIG. 2 is a diagram of circuitry useful in the embodiment of FIG. 1;

Figure 3:
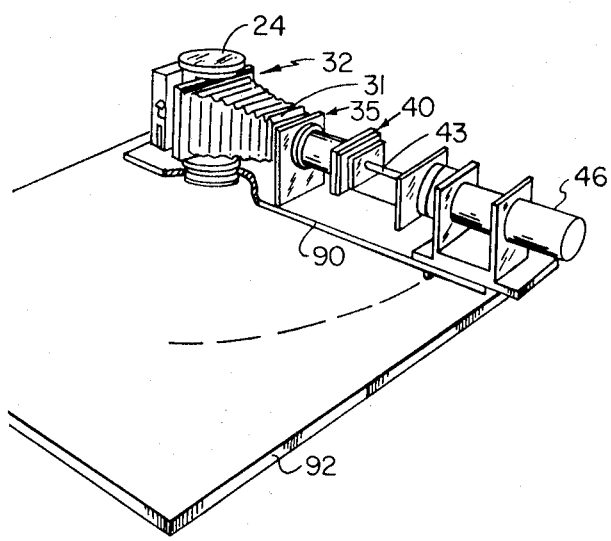
FIG. 3 is a perspective view of a portion of the apparatus of FIG. 1.

Referring to FIGS. 1 and 3, a light beam 12 having a long coherence length relative to sample size (at least 10X) is directed by a light source 14 e.g., a helium neon laser, such as Spectra Physics Model 125, producing a 6,328 A. beam having a coherence length of the order of feet or greater is directed at a sample size of the order of 0.010 inch), to a lens 16. From lens 16, the beam is focused at a sample holder 20 (including a glass cell 21), encased in a thermal insulating copper housing 22 having a light-receiving slot 23 and in an enclosing aluminum container 24 having a light-receiving aperture 25.

A plate 28 having an aperture 29 is disposed to receive a predetermined solid angle of the total light beam scattered by the sample, this solid angle being represented by a light beam 30. Beam 30 has an axis making an angle $\theta$ with the axis of light beam 12 and passes through a light-impermeable bellows 31, the bellows being secured by plate 32, having a light-passing slot 33, to container 24. A lens 34, contained in a light-impermeable housing 35 with plate 28, is located so as to focus an image of light beam 12 on a pinhole-sized orifice 38 (about 0.010 inch) in plate 40. The image of pinhole 38, projected back through the optical system to sample holder 20, determines the "sample size." The resultant light beam 42 from pinhole 38 passes through a light-impermeable tube 43, and impinges on the light-receiving face 45 of a sensor 46 (a RCA Model 7265 Photomultiplier Tube).

The electrical output of sensor 46 is fed, through a low-pass filter circuit 48 and amplifier 49, to a signal correlator 50 (Model 100, Correlation Function Computer of Princeton Applied Research Corporation, Princeton, New Jersey). The filter circuit is necessitated by the particular computer used, which is readily saturated. Signal correlator 50 is programmed to have an output signal 52 dependent on the autocorrelation function of the input from sensor 46. Signal generator 54 is constructed to produce a known electrical signal which, when subtracted from signal 52 in summing amplifier 58, will produce a resultant difference signal which a second signal generator 62 is constructed to duplicate, utilizing an oscilloscope 64 to counterbalance the two signals.

Figure 5:
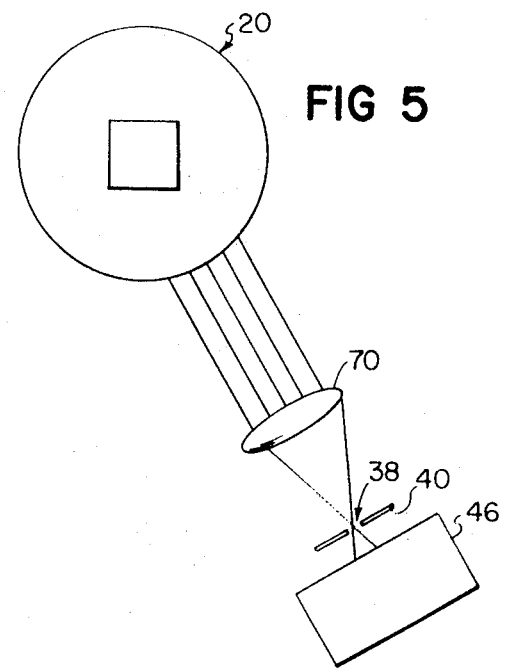
FIG. 5 is a schematic view of an alternate optical arrangement useful in the present invention.
Figure 4:
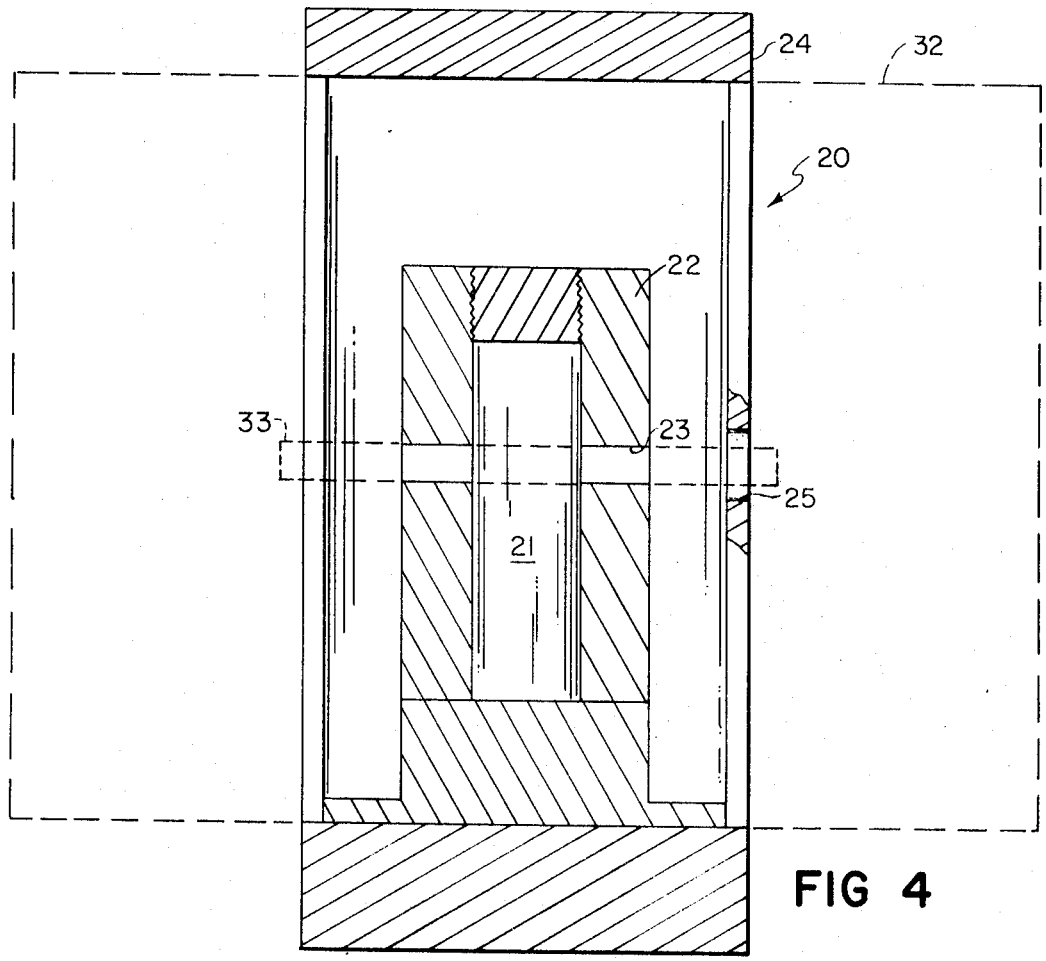
FIG. 4 is a sectional view of the sample holder of FIG. 3.

In FIG. 5, there is shown a lens 70 which, in lieu of collecting a large solid angle of scattered light having an axis $\theta$, such as is done by lens 34, collects parallel light scattered by a relatively larger sample size at an exact angle $\theta$, and focuses this light at a pinhole-containing plate 40. This sample size is still less than one-tenth the coherence length of the incident laser beam 12.

Inasmuch as the variation in intensity with time of the light scattered by macromolecules has an autocorrelation function of the form $I(t) = Ce^{-\Gamma_D t}$, where $C$ is a constant and $\Gamma_D$ is the reciprocal time constant of the curve, the signal from sensor 46 will, after being operated on by signal correlator 50, produce an electrical signal which includes an exponential component equal to the autocorrelation function of the macromolecule-scattered light intensity (power) spectrum, and an exponential component caused principally by filter 48. The latter component will be equal to a zeroing electrical signal produced when the incident light beam is directed at a calibration sample simulating a sample containing all but the unknown macromolecular species and the resultant signal operated on by the signal correlator.

Referring now to FIG. 2, signal generator circuitry 54 is constructed to produce a zeroing electrical signal which may be substracted from signal correlator signal 52. This circuit includes resistance, capacitance, transistor, and switch components as shown, and is connected to conventional summing amplifier circuitry 58 upon manual closing of switch 72. Adjustable resistances 74, 75 are provided for varying the amplitude and time constant, respectively, of the electrical signal produced by circuitry 54 until the desired zeroing signal is produced.

Signal generator circuitry 62 includes resistance, capacitance, transistor, and switch components as shown, and is connected to conventional summing amplifier circuitry 58 upon manual closing of switch 76, is constructed to provide a signal equal to the exponential signal $Ce^{-\Gamma_D t}$, and is varied by means of variable resistances 77, 78, the former controlling the amplitude of the resultant curve and the latter the time constant.

In operation, the values of resistances 74 and 75, which are related both to the low-pass filter circuit 48 (FIG. 2) and to the internal characteristics of the particular signal correlator used, are set by passing a light beam through a system which contains all but the macromolecules. A suitable macromolecular medium is prepared, which may be any medium in which the macromolecules are free to move at readily measurable velocities. For example, the macromolecules may be dissolved or dispersed in a suitable liquid or semiliquid (gel, etc.) medium, or may be in molten form. The light scattered by the macromolecules is collected by sensor 46, and converted to an electrical signal which is filtered by filter circuit 48 and fed through amplifier 49 to signal correlator 50.

The circuits 54, 62 are energized by a timing pulse from signal correlator 50, the latter being, e.g., an analog computer such as described having its readout time chosen to be convenient. The particular model shown has a readout time of 50 milliseconds. When this readout time is reached, the timing pulse is sent to circuits 54, 62. The autocorrelation signal from the computer is thereby fed simultaneously with the generated signals from circuits 54 and 62, through the summing amplifier, to the oscilloscope. Variable resistances 77 and 78 of circuit 62 are manipulated until the total of signals 54 and 62 equals the autocorrelation signal from the computer. Resistance 78 is then read out, and, since a known capacitance C (here, 1 $\mu$ F.) has been used, $\Gamma_D$ may be simply determined, for the simple RC circuit containing resistance 78 by:

$$1/2\Gamma = RC.$$

The correlation computer shown has 100 channels, each of which simultaneously obtains a value of the correlation function for a different $t$, which channels are read out as an exponential signal representative of the autocorrelation function of the intensity as a function of $t$. This rapid readout permits, e.g., a constantly changing macromolecular sample in the same medium to be analyzed at time intervals dependent only on the very small computer readout time. By comparison, conventional wave analysis instruments for scanning the variation of scattered light intensity with frequency require times in the order of an hour to produce a result. The low-pass filter circuit 48 is used to avoid saturation of the particular analog computer, by filtering out the relatively nonutilizable background or "white noise" sensor output before the sensor output signal is fed to the computer. Such external filters may be eliminated with more sophisticated computers.

As shown in FIG. 3, by mounting lens 34, plate 40, and sensor 46 on an arm 90, rotatable on a base 92, scattered light may be measured at a number of angles $\theta$, to obtain an average $\Gamma_D$, even though, as shown by the equation relating $\Gamma_D$ to $\theta$, a graph of $\Gamma_D$ against $\theta$ must pass through the origin. The translational diffusion constant, D, for generally spherical molecules, is computed by plotting $\Gamma_D$ against, e.g., $\sin^2 \theta/2$.

To compute the molecular weight of a macromolecule, a calibration curve may be made of M vs. D, where M = molecular weight, for a number of macromolecules of the same conformation in the same solvent or dispersant (e.g., a number of polymer chains of varying length). The diffusion constant of the unknown species is then read out from circuit 62. Or, information about molecular conformation may be determined by calibration with macromolecules of equal molecular weights.

Where several macromolecules are contained in solution, the output of the signal correlator will contain, in addition to background signals, a macromolecule signal of the form $I_t = Ae^{-\Gamma_1 t} + Be^{-\Gamma_2 t} \ldots$, each exponential being due to a different macromolecule. Since only one combination of exponential signals can produce the total macromolecule signal, a plurality of signal generators can be used to produce the required exponential signals. Thus, a number of macromolecules may be simultaneously analyzed in solution.

Other embodiments will occur to those skilled in the art and are within the following claims.

What is claimed is:

1. A method for measuring the diffusion constant of macromolecules contained in a medium allowing movement of said macromolecules comprising the steps of:
   directing, at a sample of said macromolecule-containing medium, an incident light beam having a coherence length which is long compared to the size of said sample,
   collecting light scattered by said sample at an angle $\theta$ to the incident light beam over a time interval
   producing a first electrical signal representative of the change of intensity of said collected light over said time interval,
   computing the autocorrelation function of said first electrical signal,
   generating a second electrical signal indicative of said computed autocorrelation function, and
   reading out from said second electrical signal data indicative of said diffusion constant.

2. The method of claim 1 including the steps of
   producing a background electrical signal indicative of the autocorrelation function of the electrical signal which represents the change of intensity of light collected from said sample, at the same angle, when said incident light beam is directed through a medium without macromolecules,
   electrically subtracting said background signal from said second electrical signal to produce a remainder electrical signal, and
   reading out said data indicative of said diffusion constant from said remainder electrical signal.

3. The method of claim 1 including the steps of producing a readout electrical signal equal to said second electrical signal by circuitry having variable components, and reading out the value of at least one of said variable components to provide said data indicative of said diffusion constant.

4. The method of claim 1 wherein a plurality of macromolecules are present in said liquid medium and said second electrical signal includes a plurality of superimposed macromolecule signals, $I_i$, each signal of the form $A_i e^{-\Gamma_i t}$, comprising the steps of producing a plurality of readout signals, each equal to one of said macromolecule signals, said readout signals produced by a corresponding plurality of electrical circuits having variable components, and reading out the value of at least one said variable component in each said circuit to provide data corresponding, respectively, to said plurality of macromolecules.

5. The method of claim 1 including the steps of collecting light at a plurality of angles $\theta$, producing a corresponding plurality of second electrical signals, and averaging said second signals to provide said data.

* * * * *